Jan. 24, 1956 A. GARFINKLE 2,732,439

TELEPHONE ATTACHMENT FOR SHOULDER REST

Filed June 1, 1953

INVENTOR.
ARTHUR GARFINKLE
BY
Zoltan H. Polachek
ATTORNEY 2,732,439
Patented Jan. 24, 1956

2,732,439

TELEPHONE ATTACHMENT FOR SHOULDER REST

Arthur Garfinkle, Brooklyn, N. Y.

Application June 1, 1953, Serial No. 358,749
6 Claims. (Cl. 179—157)

This invention relates to new and useful improvements in supports for the hand pieces of conventional portable telephones.

A principal object of the present invention is to provide a telephone support which is particularly adapted for use with the portable handset type of telephone to support the earpiece and mouthpiece thereof upon the shoulder of the user in proper position for use to enable a person to converse on the telephone and leave the hands free to make notes with a pen or pencil, handle sheets of papers, turn the leaves of a book or to perform other acts incidental to the telephone conversation.

Another object of the invention is to provide a support for the hand piece of a telephone which is constructed so that it may be readily applied to or removed from the hand piece, without interfering with the mechanism of the telephone.

A further object of the invention is to provide a support of this character which when in inoperative position, occupies a minimum of space and is practically unnoticeable.

Still another object of the invention is to provide a support of this character which may be supported on one shoulder of the user thereof without the necessity of the user moving his head and neck to an unnatural position.

It is further proposed to produce a support for the hand piece of a portable telephone which is simple and durable in construction and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figures 1, 2:
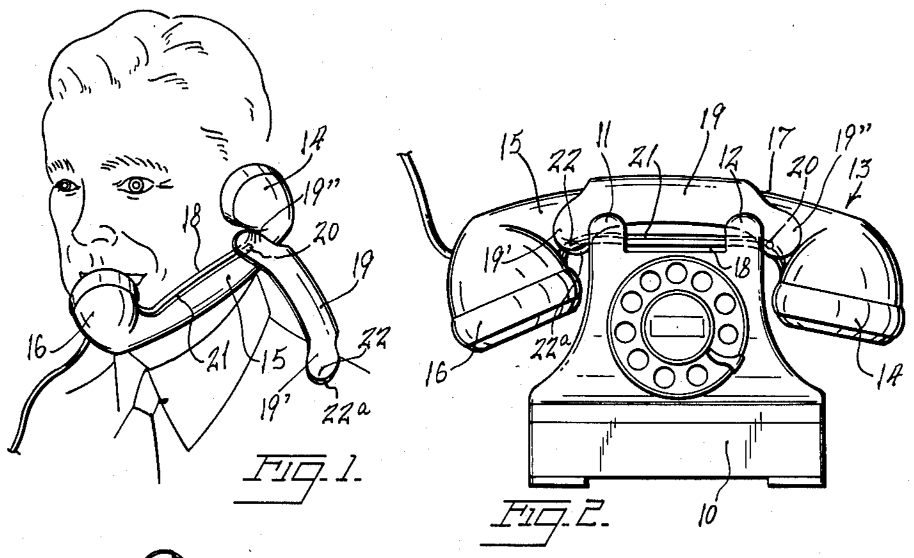
Fig. 1 is a perspective view of a hand piece or set of a portable telephone, with a support embodying the invention applied thereto and showing its manner of use.
Fig. 2 is a side elevational view of a portable telephone of the handset type with the improved support applied thereto.
Figures 3, 4, 5, 6, 7:
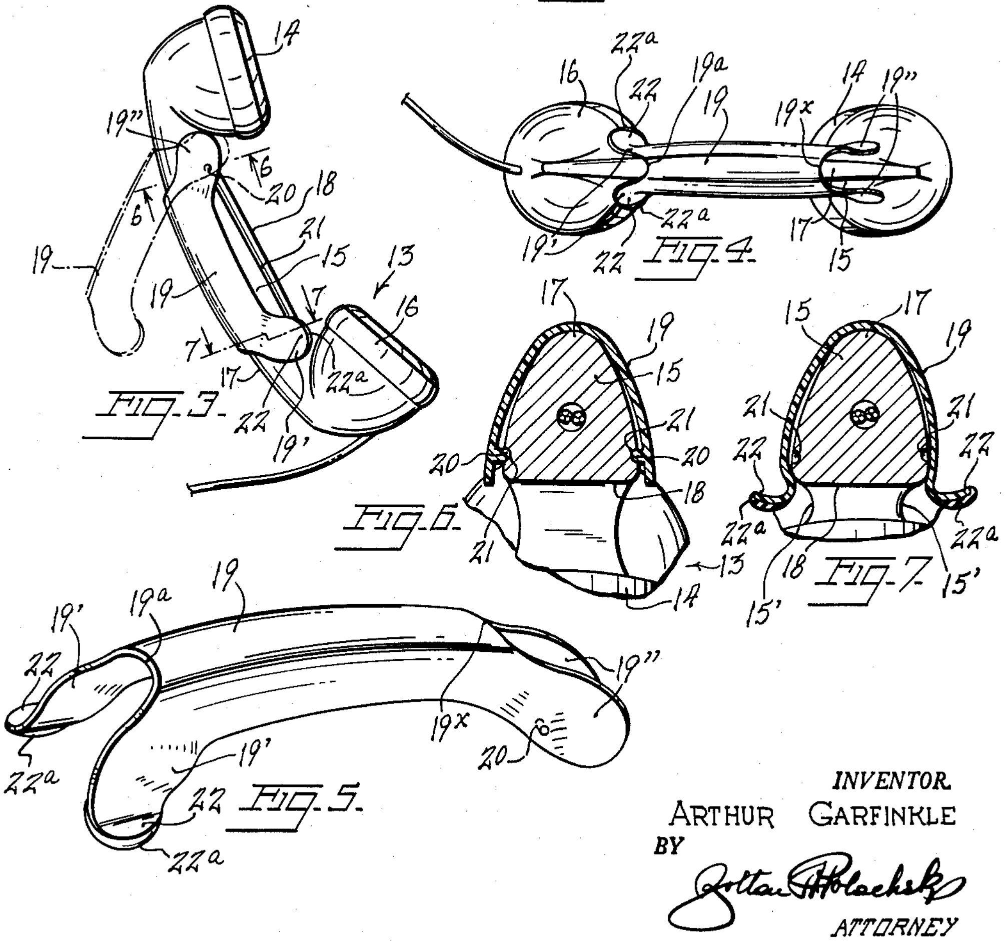
Fig. 3 is a side elevational view of the hand piece of the telephone with the support applied thereto.
Fig. 4 is a top plan view of the parts of Fig. 3.
Fig. 5 is an enlarged perspective view of the improved support.
Fig. 6 is an enlarged vertical sectional view taken on the plane of the line 6—6 of Fig. 3.
Fig. 7 is an enlarged vertical sectional view taken on the plane of the line 7—7 of Fig. 3.

Referring to the drawings in detail, the telephone base 10 is provided with spaced projections 11 and 12 forming one side of the cradle which supports the handset 13 in its inoperative position. Duplicate projections are provided on the opposite side of the cradle and the handset 13 is adapted to rest between them. The earpiece 14 on one end of the handset is connected by means of the central handle portion 15 to the mouthpiece 16 provided on the other end of the handset in the conventional manner. The handle portion 15 is of generally triangular cross-section with a convex outer face 17, a flat inner face 18 and opposed side grooves 15′ adjacent the inner face.

According to the present invention, a support is adapted to be mounted on the handle portion 15 and said support comprises an elongated, hollow body 19 of inverted substantially V-shaped cross-section so as to fit snugly over the outer convex face 17 of the handle portion. The support may be formed of sheet metal, plastic or other suitable material so as to provide a thin yieldable wall and open at both ends in order to facilitate slipping the support over the handle portion. The body is cut away at both ends forming a pair of pronged extensions 19′ at one end, with a shoulder $19^a$ between the extensions, and forming a pair of similar pronged extensions 19″ at the other end, with a shoulder $19^x$ therebetween. Opposed lugs 20 are integrally formed on the inner surfaces of the extensions 19″ and are adapted to be snapped into opposed grooves 21 formed in the handle portion 15 adjacent the earpiece 14. The extreme ends or flanges 22 of the projections 19′ are curled and bent outwardly and due to the resiliency of the material of the body are adapted to be snapped over the lower side edges of the handle portion and into the grooves 15′. The lugs 20 and the curled ends 22 serve to hold the support on the handle portion 15 when the support is not in use.

The bottom surfaces of the curled and bent ends 22 of the extensions 19′ are preferably provided with a rubberized lining $22^a$ which may be formed by dipping said bottom surfaces in rubber of fluid consistency or by cementing a rubber sheet to said bottom surfaces. The rubberized surfaces prevent the support from slipping off its supporting surface.

In use, the curled ends 22 of the extensions 19′ are released manually by the fingers of the user and the body swung on the lugs 20 outwardly of the handle portion to extended position. The shoulder $19^x$ serves to engage the handle portion 15 and limit the outward movement of the support and at the same time positions the support at the proper angle for supporting the handset as shown in Fig. 1. When the support is in extended position, the rubberized curled ends of the extensions 19′ are adapted to seat on the shoulder of the user forming a two-point, broad, balanced support for the handset, with the earpiece 14 positioned adjacent the ear of the user and with the mouthpiece 16 positioned just below the mouth of the user. The rubberized surfaces of the ends 22 prevent the support from slipping off of the shoulder of the user.

It will thus be seen that I have provided a telephone hand piece support which occupies a minimum of space in closed position and in no way interferes with gripping the hand piece. Furthermore, the support in no way affects the mechanical and electrical operation of the telephone. The support is relatively simple in construction, inexpensive to manufacture and very effective in performing the functions for which it is intended, namely, to support the hand piece in position for use on the user's shoulder, thus leaving both hands free while carrying on the telephone conversation.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A support for a telephone hand piece having grooves extending along either side thereof comprising an elongated inverted substantially V-shaped hollow yieldable body adapted to surround the body of a hand piece of a portable telephone, and opposed studs extending inwardly from the sides of the yieldable body at one end thereof and engageable in the grooves of a handpiece.

2. A telephone hand piece support comprising an elongated inverted substantially V-shaped hollow body adapted to surround the body of a hand piece of a portable telephone, opposed studs extending inwardly from the sides of the body at one end thereof, and outwardly curled end flanges at the opposite extremities of said hollow body adapted for seating on a shoulder of a user of the support.

3. A support for a telephone hand piece having a convex outer face, a flat inner face and grooved sides, said support comprising an elongated inverted substantially V-shaped body, open at both extremities and adapted to be inserted over the telephone hand piece, opposed lugs on the sides of the body at one end thereof for engagement with the hand piece, and opposed outwardly curled flanges on the body at the other end thereof for engagement with the flat face and grooves of the hand piece, the curled flanges of said body being adapted to bear upon the shoulder of the user when the body is extended.

4. A support for a telephone hand piece having a convex outer face, a flat inner face and grooved sides, said support comprising an elongated inverted substantially V-shaped resilient body, open at both ends, adapted to be inserted over the telephone hand piece, said body having cutout portions at both ends forming shoulder portions thereat, opposed lugs on the sides of the body at one end thereof for pivotal engagement with the hand piece, the shoulder portion at the pivotal end of the body serving as a stop to limit the pivotal movement thereof, and opposed curled end portions at the end of the body opposite the lug supporting end, said curled end portions being adapted to engage the flat inner face and the grooved portions of said hand piece for holding the support on the hand piece in inoperative position and for bearing upon the shoulder of the user when said support is extended to operative position.

5. A support for a telephone hand piece having a convex outer face, a flat inner face and grooved sides, said support comprising an elongated inverted substantially V-shaped resilient body, open at both ends, and having cutaway portions at both ends of its top portion providing pairs of pronged extensions at both ends and a shoulder portion between the extensions of each pair, opposed lugs on the extensions at one end of the body for pivotal engagement with the grooves in the sides of the hand piece, the shoulder portion at the pivotal end of the body serving as a stop to limit the pivotal movement thereof, the extreme ends of the extensions at the end of the body opposite the pivotal end being curled and bent outwardly, said curled ends being adapted to engage the flat inner face and grooves in the sides of the hand piece for holding the support on the hand piece when said support is in inoperative position, and for bearing upon the shoulder of the user when said support is extended to operative position, and rubberized linings on the curled ends to prevent the support from slipping off the shoulder of the user when the support is in operative position.

6. The combination of a telephone handset and a shoulder attachment comprising, opposed elongated grooves in said handset and lugs on said shoulder attachment extending into said grooves for pivotal engagement with the handset, the ends of said grooves serving as stops to limit the movement of the lugs in the grooves.

References Cited in the file of this patent

UNITED STATES PATENTS

| | | |
|---|---|---|
| 2,575,306 | Van Dyke | Nov. 13, 1951 |
| 2,584,807 | Miller | Feb. 5, 1952 |
| 2,687,452 | Trank | Aug. 24, 1954 |